operative connections between said nut and the collar whereby the latter is afforded an axial movement when the nut is rotated, link connections between said collar and the cross-head, and connections between the shaft and said link connections whereby the latter are influenced to transmit axial movement to the cross-head when the collar is actuated by rotating said nut.

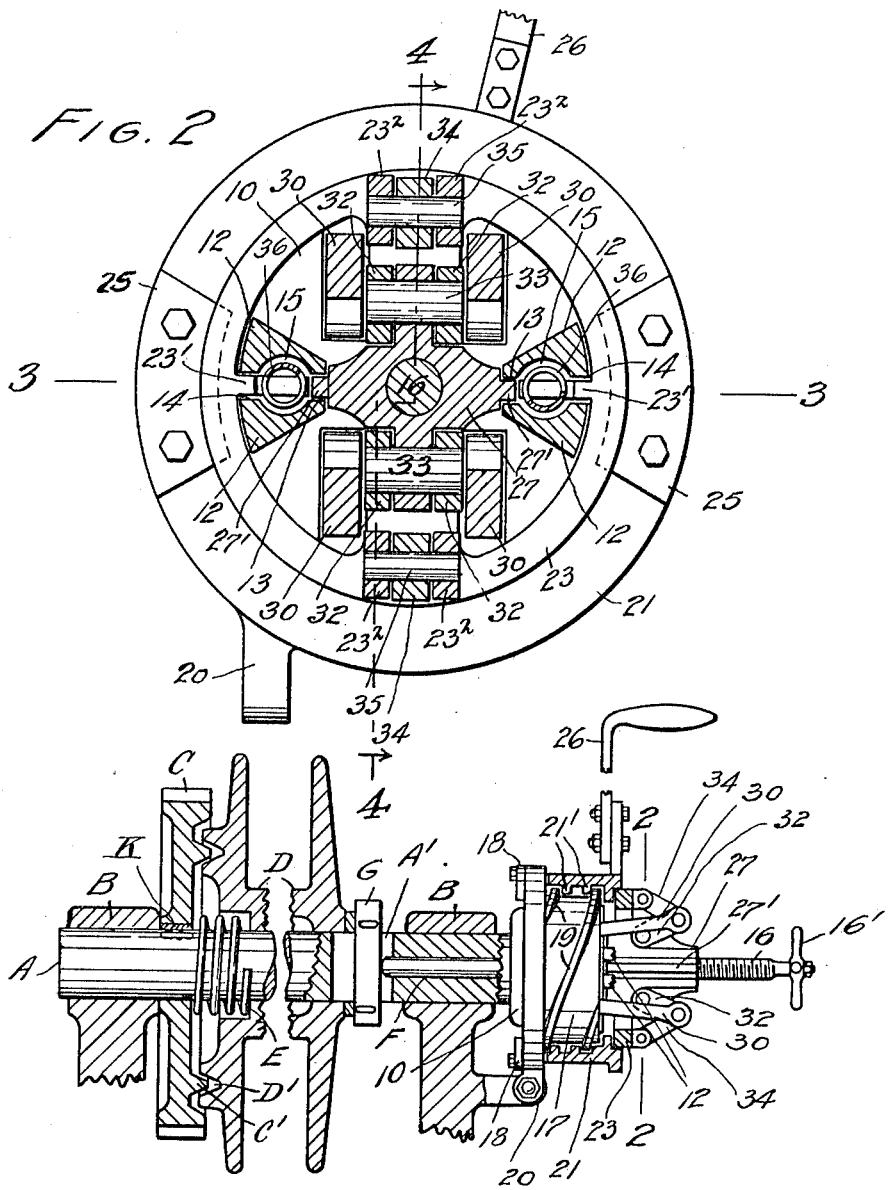

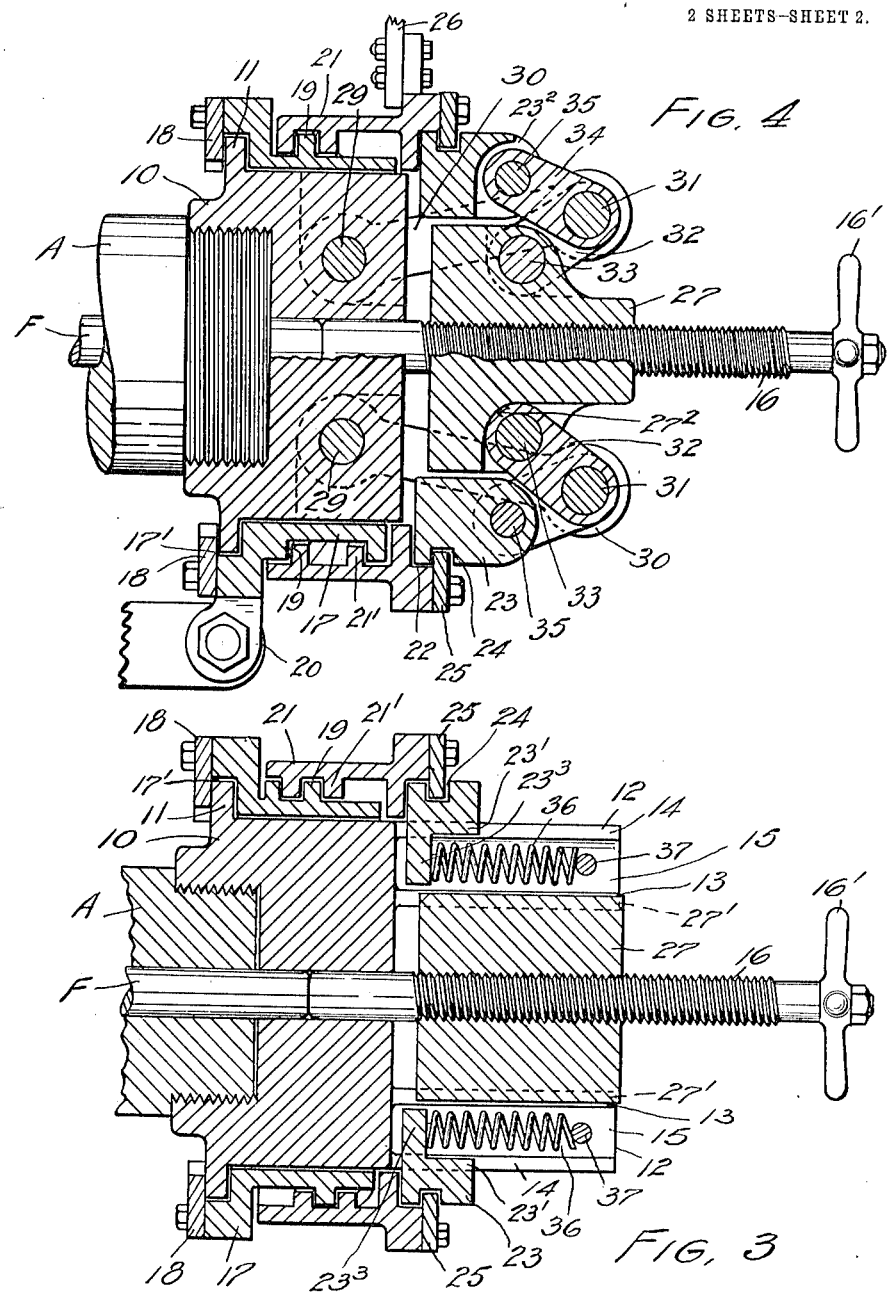

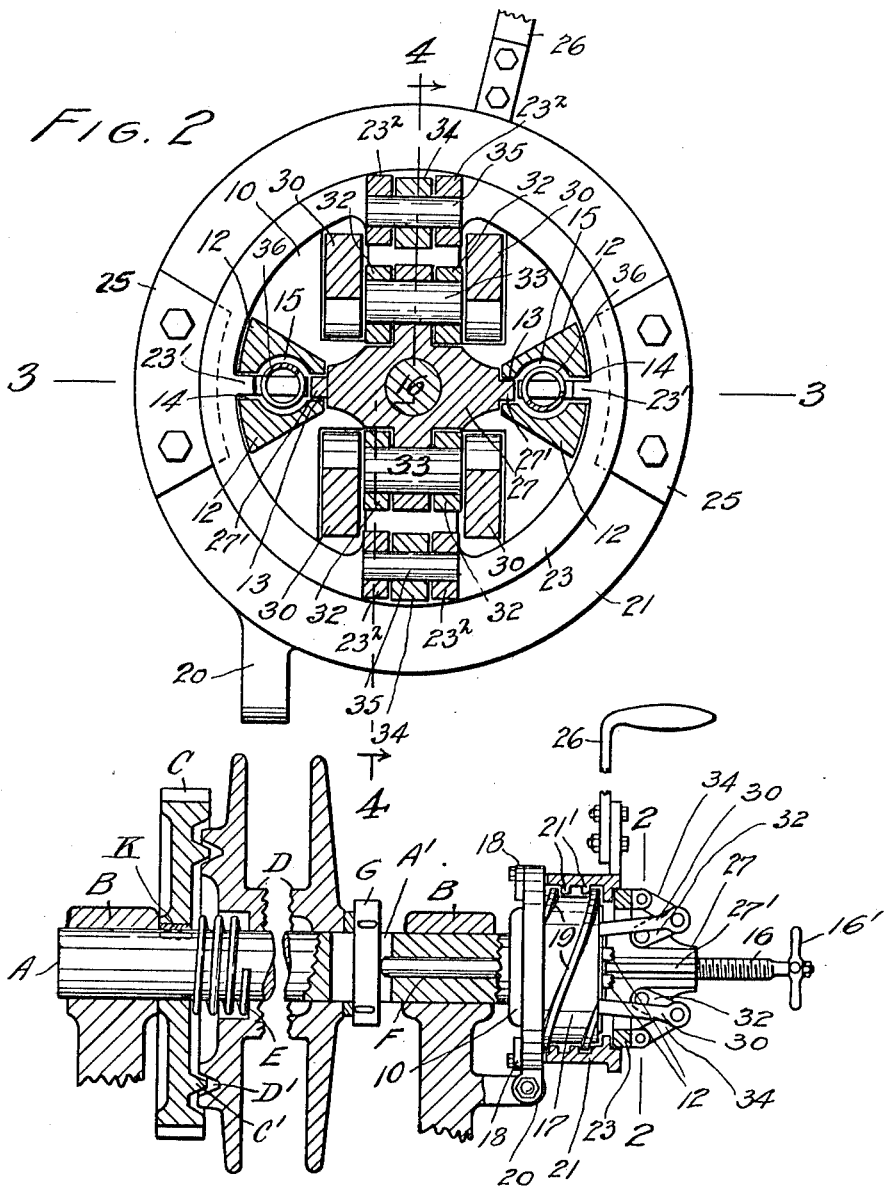

7. In mechanism of the class described, the combination with a drum-shaft and a thrust-pin extending axially thereinto, of a head rigidly connected to said shaft, a sleeve provided with external screw-threads mounted upon said head and secured against both rotary and longitudinal movements, a nut rotatably mounted on said sleeve and engaging the threads thereof, a cross-head, a thrust-screw extending axially through the cross-head to engage against the end of said thrust-pin, a collar connected with said nut for longitudinal movements therewith, means provided on both the cross-head and the collar and engageable with the head whereby they are caused to rotate in unison therewith and are afforded independent longitudinal movements, and three sets of links having their inner ends connected, respectively, with the head, the cross-head and the collar whereas the outer ends of the links are connected with each other.

8. In mechanism of the class described, the combination with a drum-shaft and a thrust-pin extending axially thereinto, of a head rigidly connected to said shaft and provided with posts extending longitudinally therefrom, a sleeve provided with external screw-threads mounted upon said head and secured against both rotary and longitudinal movements, a nut rotatably mounted on said sleeve and engaging the threads thereof, a cross-head, a thrust-screw extending axially through the cross-head to engage against the end of said thrust-pin, a collar connected with said nut for longitudinal movements therewith, means provided on both the cross-head and the collar and engageable with the posts of the head whereby they are caused to rotate in unison therewith and are afforded independent longitudinal movements, and three sets of links having their inner ends connected, respectively, with the head, the cross-head, and the collar whereas the outer ends of the links are connected with each other.

Signed at Seattle, Wash., this 15th day of January, 1913.

JOHN J. PETER.

Witnesses:
 HORACE BARNES,
 E. PETERSON.

---

Copies of this patent may be obtained for five cents each, by addressing the "Commissioner of Patents, Washington, D. C."